UNITED STATES PATENT OFFICE.

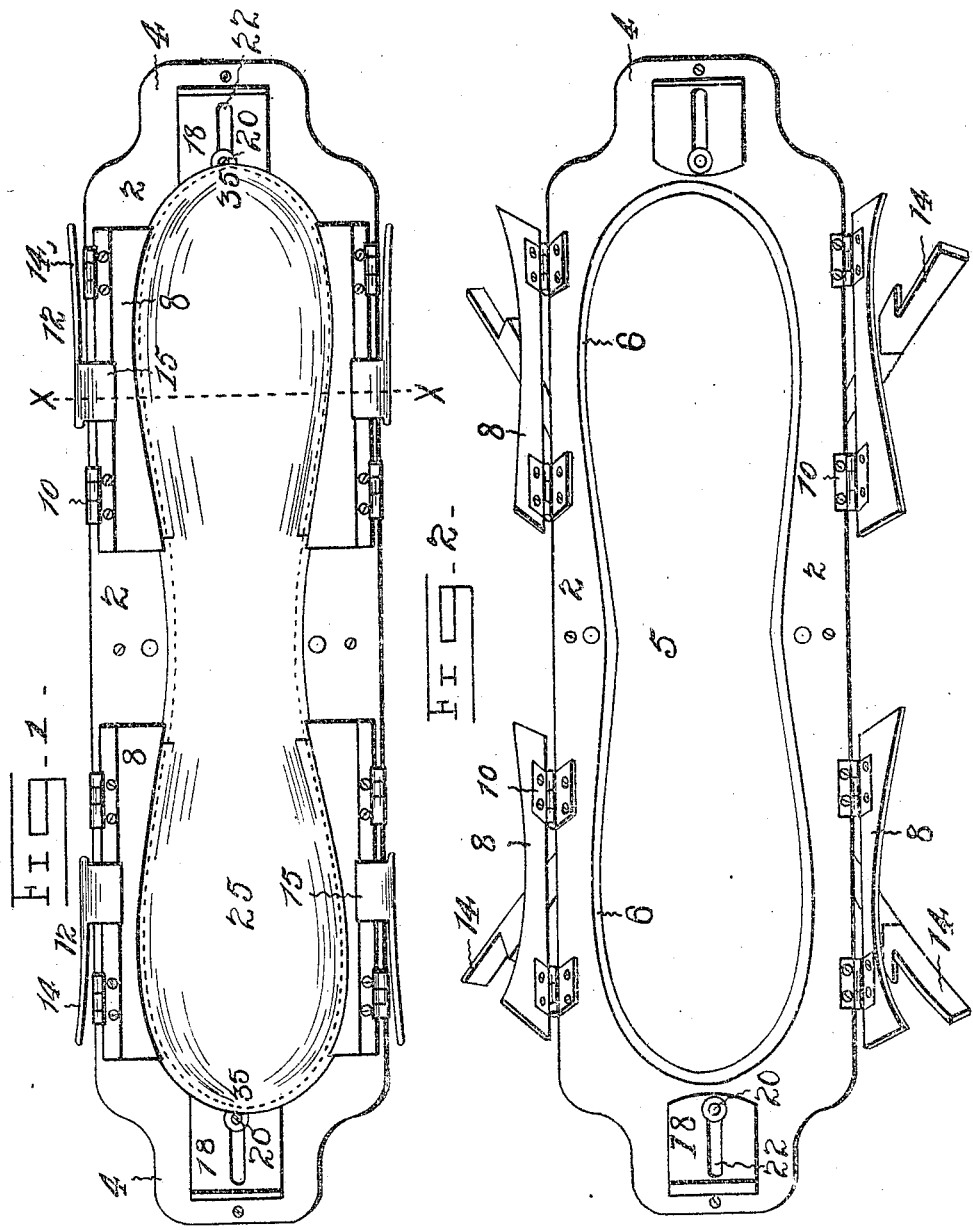

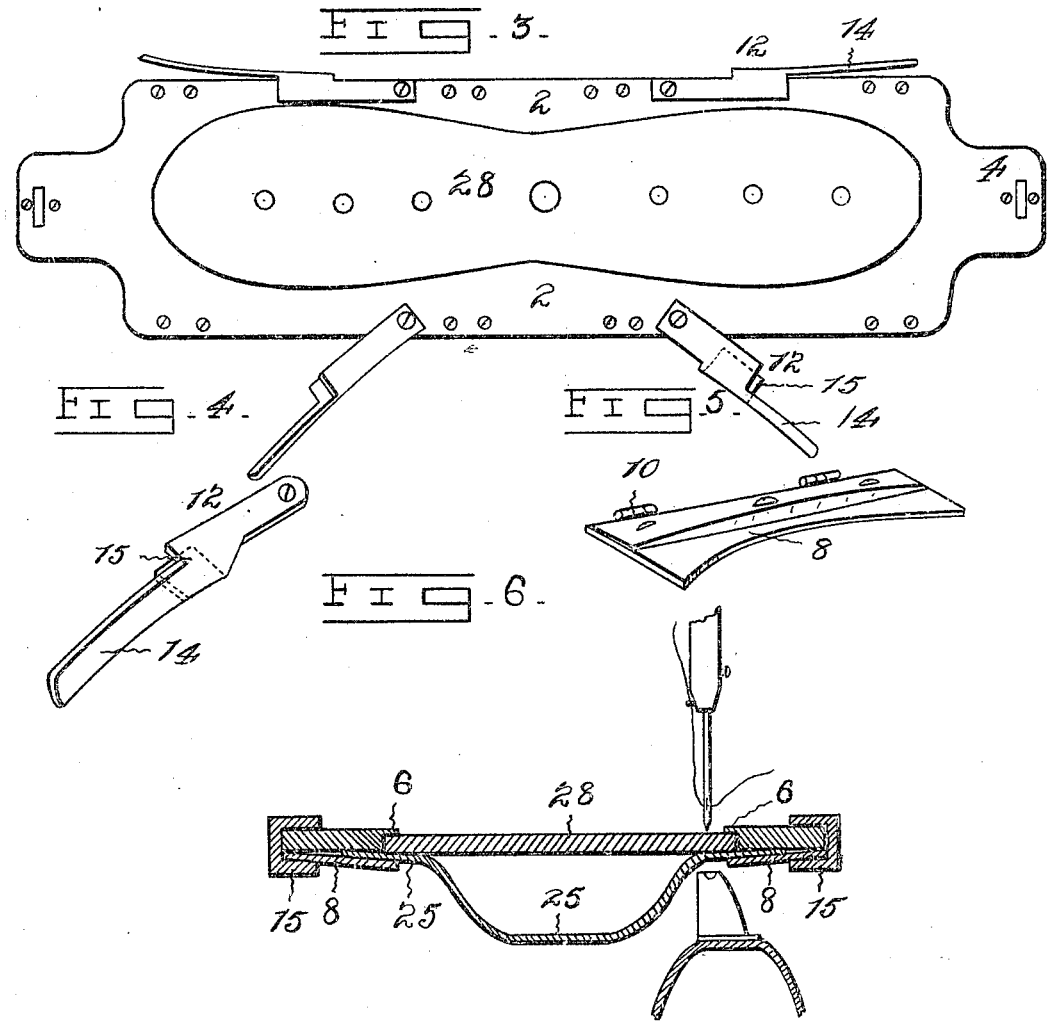

CASPER H. GRINGS, OF DUBUQUE, IOWA, ASSIGNOR TO THE WATERLOO SADDLERY CO., OF WATERLOO, IOWA, A CORPORATION OF IOWA.

MACHINE FOR MANUFACTURING HARNESS-PADS.

959,519. Specification of Letters Patent. Patented May 31, 1910.

Application filed September 24, 1909. Serial No. 519,466.

*To all whom it may concern:*

Be it known that I, CASPER H. GRINGS, a citizen of the United States, residing at Dubuque, in the county of Dubuque and State of Iowa, have invented certain new and useful Improvements in Machines for Manufacturing Harness-Pads, of which the following is a specification.

The object of my invention is to provide means for the manufacture of harness pads whereby the pad may be quickly and cheaply manufactured and such manufacture be done without the aid of an expert.

It consists in forming or shaping the pad bottoms of the size and shape desired, then placing them in an appliance in which the bur-piece is held and holding the bur-piece and the pad bottoms in contact with each other while they are stitched or otherwise fastened together, then after uniting them together the pads may be stuffed or the stuffing may be packed into the pad bottoms before the uniting together of the bur-piece and pad bottoms.

The manner in which I accomplish the ends sought will be fully explained and illustrated in the following specification and the drawings accompanying the same and forming a part hereof.

Figure 1 is a bottom view of the frame with the pad bottom and bur-piece in position for uniting them together. Fig. 2 is a bottom view of the frame with the pad bottoms and bur-piece removed and showing two of the wings open and two closed and one clamped. Fig. 3 is a top view of the frame with the bur-piece in position. Fig. 4 is a perspective view of one of the clamps. Fig. 5 is a perspective view of the pad bottoms. Fig. 6 is a cross section inverted through line *x—x* of Fig. 1 and in position for uniting the bur-piece and pad bottoms together.

Like characters of reference denote corresponding parts in each of the figures.

In the drawings, 2 represents the frame which is of oblong shape having the handles 4 at each end. This plate or frame is cut away at the central portion 5 in the shape of the pad bottoms when united together and around the inner edge of the cut away portion of the frame is a shoulder 6. This shoulder 6 being of uniform width is important as it not only serves as a rest for the bur-piece when the bur-piece is being united to the pad bottoms, but also serves as a guide for the sewing machine when the bur-piece and pad bottoms are stitched together and thereby insures an even row of stitching or other fastening. Against one side of the outer edges of the frame are hinged four wings 8 by the hinges 10. The wings are adapted to conform at their inner edges nearly to the shape of the opening in the frame and when closed down on the frame extend to the opening 5 or a trifle beyond and nearly the length of each pad bottom.

To the opposite side of the frame and about midway of each wing are provided four clamps 12 one for each wing, each provided with a handle 14 and side pieces 15. The side pieces are set at a slight angle to the handle so that there is a slightly greater distance between the outer edges of the side pieces than where they are attached to the body of the clamp. By means of these clamps 12 the bur-piece and pad bottoms, near where they are united together, are rigidly clamped between the shoulders 6 and the wings 8 and are thereby held rigid and true for stitching or otherwise uniting them together. At each end of the frame there is fixed a sliding plate 18 by a pin 20, secured in the frame through a slot 22 in the plate 18.

The manner of operating my device is substantially as follows:—The pad bottoms 25 are first formed into the shape and size desired, then the bur-piece 28 is placed upon the shoulder 6 with the finished side facing downward through the frame, then the pad bottoms are placed upon the bur-piece with the bottom of the pad facing downward and the wings 8 are turned down upon the edges of the pad bottoms. The operator grasps the handles 14 of the clamps 12 and brings the side pieces 15 into engagement with the upper side of the wing and the underside of the frame thus rigidly clamping the pad bottoms and the bur-piece together between the shoulder 6 and the wings 8. Then the operator takes the frame with the pad bottoms and bur-piece clamped together and proceeds to stitch the two together on a sewing machine, sewing just outside of the shoulder 6 or otherwise fastened at the same place. If the pad bottoms are already stuffed or packed then the operator can sew entirely around the pads and the pads are finished. If the pads are not packed then the operator unites them together all around the pads except at each end and leaves a space through which the stuffing is inserted to pack the pad. If it be desired to unite the bur-piece with the pad bottom other than by stitching, then the frame is placed over an anvil and the tacks are driven through the bur-piece and the pads and clenched upon the anvil, but without releasing the clamps. To remove the finished pad, simply release the clamps and raise the wings 8 and then the united bur-piece and pad bottoms can readily be removed.

Having now described my invention what I claim is:—

1. In a device of the class described, a frame provided with an opening in its central portion, means on the inner edge of the frame for sustaining the bur-piece, and means secured to the frame for holding the pad bottoms upon the bur-piece while the bur-piece and pad bottoms are being united together.

2. In a device of the class described, a frame, a shoulder projecting from the inner edge of the frame adapted to support the bur-piece, and means connected with the frame for holding the pad bottoms upon the bur-piece while the bur-piece is being united to the pad bottoms.

3. In a device of the class described, a frame, means attached to the inner edge of the frame for supporting the bur-piece, wings secured to the frame and adapted to engage the pad bottoms upon the bur-piece, and means connected with the frame for holding the wings rigidly on the pad bottoms and while the bur-piece and the pad bottoms are being secured together.

4. In a device of the class described, a frame provided with an opening near the center, a shoulder on the inner edge of the frame for supporting the bur-piece, wings attached to the frame and adapted to engage the edges of the pad bottoms, and clamps engaging the frame and wings for holding the wings upon the pad bottoms upon the bur-piece while the same are being united together.

5. In a device of the class described, a frame, a shoulder projecting from the inner edge of the frame for supporting the bur-piece, wings hinged to the opposite outer edges of the frame and adapted to engage the pad bottom resting upon the bur-piece, and a clamp adapted to engage one side of the frame and opposite side of the wing and securely clamp the pad bottom upon the bur-piece while the two are being united together.

6. In a device of the class described, a frame cut away in the center, a shoulder projecting inwardly from the frame and adapted to sustain the bur-piece, wings attached to the frame and adapted to engage the pad bottoms, and means adapted to engage the wings and clamp the pad bottoms and the bur-piece between the shoulder in the frame and the wings and securely hold them while they are being united together.

7. In a device of the class described, a frame cut away in the central portion in the form of a bur-piece, a shoulder of uniform width projecting inwardly around the inner edge of the frame for supporting the bur-piece and providing a guide to unite the bur-piece and pad bottoms together, wings attached to the frame, and clamps adapted to engage the frame and wings and clamp the bur-piece and pad bottoms together between the shoulder in the frame and the wings on the frame.

In testimony whereof I affix my signature in presence of two witnesses.

CASPER H. GRINGS.

Witnesses:
M. M. CADY,
E. M. NOONAN.